United States Patent
Seo et al.

(10) Patent No.: US 10,177,906 B2
(45) Date of Patent: Jan. 8, 2019

(54) METHOD AND APPARATUS FOR ENCRYPTING DATA

(71) Applicant: SAMSUNG ELECTRONICS CO., LTD., Suwon-si (KR)

(72) Inventors: Jae Woo Seo, Suwon-si (KR); Yong Ho Hwang, Seoul (KR); Sungwook Kim, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 228 days.

(21) Appl. No.: 14/687,465

(22) Filed: Apr. 15, 2015

(65) Prior Publication Data

US 2017/0063528 A1    Mar. 2, 2017

(30) Foreign Application Priority Data

May 14, 2014 (KR) .......... 10-2014-0057838

(51) Int. Cl.
| | |
|---|---|
| *H04L 9/06* | (2006.01) |
| *G06F 21/62* | (2013.01) |
| *H04L 9/08* | (2006.01) |

(52) U.S. Cl.
CPC ........ *H04L 9/0618* (2013.01); *G06F 21/6227* (2013.01); *H04L 9/0643* (2013.01); *H04L 9/0662* (2013.01); *H04L 9/0861* (2013.01); *H04L 9/0869* (2013.01)

(58) Field of Classification Search
CPC . G06F 21/6227; H04L 9/0618; H04L 9/0662; H04L 9/0861; H04L 9/0869
See application file for complete search history.

(56) References Cited

U.S. PATENT DOCUMENTS

| | | | |
|---|---|---|---|
| 9,037,860 B1* | 5/2015 | Kerschbaum | ....... H04L 63/0428 713/168 |
| 2008/0282096 A1 | 11/2008 | Agrawal et al. | |
| 2012/0121080 A1 | 5/2012 | Kerschbaum | |
| 2012/0163586 A1 | 6/2012 | Jho et al. | |
| 2014/0089678 A1* | 3/2014 | Teranishi | ................ G06F 21/72 713/189 |
| 2015/0149427 A1* | 5/2015 | Kerschbaum | ....... G06F 21/6227 707/706 |

FOREIGN PATENT DOCUMENTS

KR    10-1115490 B1    5/2012

OTHER PUBLICATIONS

Mengke et al., "Key-Controlled Order-Processing Encryption", 2010, pp. 1-5, https://eprint.iacr.org/2010/268.pdf.*
Boldyreva et al., "Order-Preserving Symmetric Encryption", Georgia Institute of Technology, Atlanta, GA, USA, 24 pages, 2009.

* cited by examiner

*Primary Examiner* — Izunna Okeke
*Assistant Examiner* — Hee Song
(74) *Attorney, Agent, or Firm* — Sughrue Mion, PLLC

(57) ABSTRACT

The method for performing encryption including generating a secret key or a parameter for encrypting plaintext; converting the plaintext into ciphertext by using the secret key or the parameter; and transmitting the ciphertext to a database.

16 Claims, 4 Drawing Sheets

METHOD AND APPARATUS FOR ENCRYPTING DATA

CROSS-REFERENCE TO RELATED APPLICATION

This application claims priority under 35 U.S.C. § 119(a) to Korean Application Patent No. 10-2014-0057838, which was filed in the Korean Intellectual Property Office on May 14, 2014, the entire content of which is hereby incorporated by reference.

TECHNICAL FIELD

One or more exemplary embodiments relates to a method and an apparatus for encrypting data, and more particularly to a method and an apparatus for encrypting data while maintaining a sequential order of the original data in the encrypted data.

BACKGROUND

When data is encrypted and the encrypted data is stored in a database, the encrypted data may be arranged in an order entirely different from an order of the original data. This is because an encryption process converts original data into optional values, which causes the original data to be unpredictable. For this reason, when the data stored in the database is encrypted, a search, such as a range query, cannot be made without first decrypting the data.

As a method in the related art enabling a search such as a range query, there is an order-preserving encryption method. The order-preserving encryption method is a scheme which provides order information of original data elements to encrypted data elements. For example, a case is considered in which original data elements A, B, and C exist and are values different from each other in accordance with A<B<C. Also, in this case, when ciphertext of A encrypted by using the order-preserving encryption method is A', ciphertext of B encrypted by using the order-preserving encryption method is B', and ciphertext of C encrypted by using the order-preserving encryption method is C', and A', B' and C' have sizes expressed by A'<B'<C', which is identical to the order according to the sizes of the original data elements.

SUMMARY

However, when the length of the original data is equal to m bits, the length of ciphertext is equal to n bits where m<n, the above-described order-preserving encryption method needs to repeatedly perform an arithmetic operation up to a maximum of n times in order to decrypt the ciphertext. Accordingly, the order-preserving encryption method is disadvantageous in that complex arithmetic operations are performed.

An aspect of one or more exemplary embodiment is to provide a method and an apparatus for encryption which are capable of easily performing encryption or decryption while maintaining a sequential order according to sizes of original data elements.

In accordance with an aspect of the present disclosure, a method for performing encryption by an encryption apparatus is provided. The method may include generating a secret key or a parameter for encrypting plaintext; converting the plaintext into ciphertext by using the secret key or the parameter; and transmitting the ciphertext to a database. The secret key may be represented as $\{\alpha, \beta, \gamma, K\}$, the parameter may be represented by N, the plaintext may be represented by x, and the ciphertext may be represented by C.

The method may further include delivering a range query to the database; and receiving ciphertext corresponding to the range query from the database.

The method may further include reconstructing plaintext from the ciphertext by using the parameter N or the secret key $\{\alpha, \beta, \gamma, K\}$.

The generating of the secret key $\{\alpha, \beta, \gamma, K\}$ or the parameter N for encrypting the plaintext x may include determining the parameter N and the secret key $\{\alpha, \beta, \gamma, K\}$ by using a bit size d of the plaintext x.

Among the secret key $\{\alpha, \beta, \gamma, K\}$, $\gamma$ is a number between 0 and $\alpha$ ($0<\gamma<\alpha$), $\beta$ is a number between ½ and 1 ($½<\beta<1$), K is a pseudo-random number according to a pseudo-random function, and $\alpha$ is equal to 1 minus $\beta$ ($\alpha=1-\beta$). $\tau$ may represent a value which minimizes a distance between two output values which are output from the encryption apparatus. N may be the ceiling of $$\frac{\tau}{\beta \cdot \gamma^d} \left( N = \left\lceil \frac{\tau}{\beta \cdot \gamma^d} \right\rceil \right).$$

Converting the plaintext x into the ciphertext C may include: determining a set of secret key vectors a based on parameter N, secret key $\{\alpha, \beta, \gamma, K\}$, and plaintext x; and converting plaintext x into ciphertext C using the set of secret key vectors a. Plaintext x may be a d-bit binary number, and $x_{d-j}$ may represent a bit value of plaintext x at the (d−j)th position, where ($1 \le j \le d$), according to: $x:=(x_{d-1}, x_{d-2}, \ldots, x_0)$. The set of secret key vectors a may include one or more secret key vectors $a_i$, where ($0 \le i \le d$), according to: $a_i:=(a_0, a_1, \ldots, a_d)$. The ciphertext C may be determined according to the equation: $C = a_0 + a_1(2x_{d-1}-1) + \ldots a_d(2x_0-1) = a_0 + \Sigma_{i=1}^{d}(2x_{d-i}-1))a_i$, where ($0 \le i \le d$).

The generating the secret key $\{\alpha, \beta, \gamma, K\}$ or the parameter N may include generating both the secret key $\{\alpha, \beta, \gamma, K\}$ and the parameter N.

The secret key vector $a_i$, with ($0 \le i \le d$), may be defined by:

$$a_i = \begin{cases} F_0(K, 0), & \text{if } i = 0, \text{ where } (\alpha N \le F_0(K, 0) \le \beta N) \\ F_i(K, x_{d-i}), & \text{if } 1 \le i \le d, \text{ where } (\alpha N \gamma^i \le F_i(K, x_{d-i}) \le \beta N \gamma^i) \end{cases},$$

wherein $F_i$, with ($0 \le i \le d$), is a function.

$F_i$, with ($0 \le i \le d$), may be a cryptographic hash function or a pseudo-random function.

In accordance with another aspect of the present disclosure, an encryption apparatus is provided. The encryption apparatus may include a key generator that generates a secret key or a parameter for encrypting plaintext; and an encryptor that converts the plaintext into ciphertext by using the secret key or the parameter and delivers the ciphertext to a database. The secret key may be represented as $\{\alpha, \beta, \gamma, K\}$, the parameter may be represented by N, the plaintext may be represented by x, and the ciphertext may be represented by C.

The encryption apparatus may be configured to deliver a range query to the database, and receive ciphertext corresponding to the range query from the database.

The key generator may be configured to determine the parameter N and the secret key $\{\alpha, \beta, \gamma, K\}$ by using a bit size d of the plaintext x.

The encryption apparatus may further include a decryptor configured to reconstruct plaintext from the ciphertext by using the parameter N or the secret key $\{\alpha, \beta, \gamma, K\}$.

Among the secret key $\{\alpha, \beta, \gamma, K\}$, $\gamma$ is a number between 0 and $\alpha$ ($0<\gamma<\alpha$), $\beta$ is a number between ½ and 1 (½<$\beta$<1), K is a pseudo-random number according to a pseudo-random function, and $\alpha$ is equal to 1 minus $\beta$ ($\alpha=1-\beta$). $\tau$ may represent a value which minimizes a distance between two output values which are output from the encryption apparatus. N may be the ceiling of $$\frac{\tau}{\beta \cdot \gamma^d}\left(N = \left\lceil \frac{\tau}{\beta \cdot \gamma^d} \right\rceil\right).$$

The key generator may be further configured to calculate $\alpha$ and N according to their respective functions.

The encryptor may be further configured to: determine a set of secret key vectors a based on parameter N, secret key $\{\alpha, \beta, \gamma, K\}$, and plaintext x; and convert plaintext x into ciphertext C using the set of secret key vectors a. Plaintext x may be a d-bit binary number, and $x_{d-j}$ may represent a bit value of plaintext x at the (d−j)th position, where (1≤j≤d), according to: $x:=(x_{d-1}, x_{d-2}, \ldots, x_0)$. The set of secret key vectors a may include one or more secret key vectors $a_i$, where (0≤i≤d), according to: $a_i:=(a_0, a_1, \ldots, a_d)$. The ciphertext C may be determined according to the equation: $C=a_0+a_1(2x_{d-1}-1)+ \ldots a_d(2x_0-1)=a_0+\Sigma_{i=1}^{d}(2x_{d-i}-1))a_i$, where (0≤i≤d).

The key generator may be configured to generate both the secret key $\{\alpha, \beta, \gamma, K\}$ and the parameter N.

The secret key vector $a_i$, with (0≤i≤d), may be defined by:

$$a_i = \begin{cases} F_0(K, 0), \text{ if } i = 0, \text{ where } (\alpha N \leq F_0(K, 0) \leq \beta N) \\ F_i(K, x_{d-i}), \text{ if } 1 \leq i \leq d, \text{ where } (\alpha N\gamma^i \leq F_i(K, x_{d-i}) \leq \beta N\gamma^i) \end{cases},$$

wherein $F_i$, with (0≤i≤d), is a function.

$F_i$, with (0≤i≤d), may be a cryptographic hash function or a pseudo-random function.

According to embodiments of the present disclosure, the method and the apparatus for encryption can be provided which are capable of easily performing encryption or decryption simultaneously with maintaining the order according to the sizes of the original data elements.

BRIEF DESCRIPTION OF THE DRAWINGS

The above and other aspects, features, and advantages of one or more exemplary embodiments will be more apparent from the following detailed description taken in conjunction with the accompanying drawings, in which.

DETAILED DESCRIPTION

Figure 1:
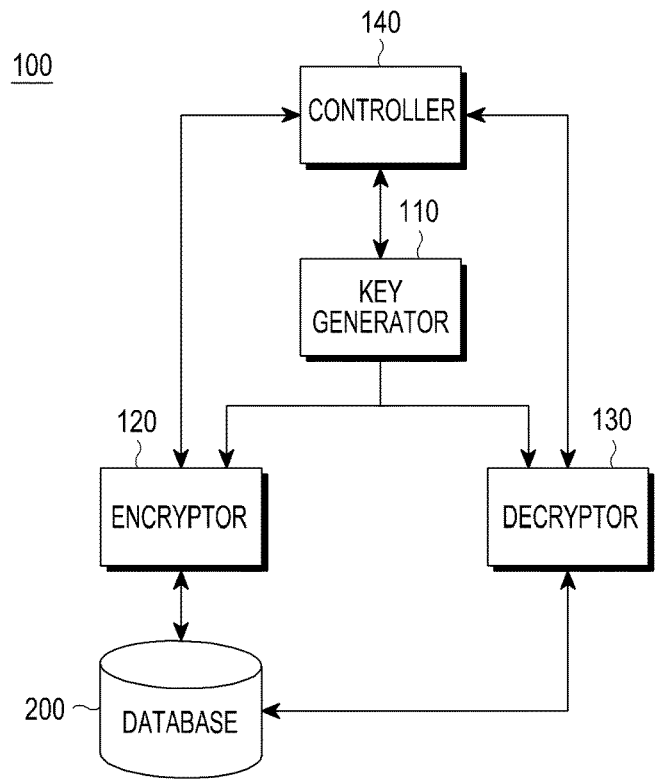
FIG. 1 is a block diagram illustrating a configuration of an encryption apparatus according to various exemplary embodiments.

Hereinafter, various exemplary embodiments will be described with reference to the enclosed drawings. The present disclosure may be modified in various forms and include various embodiments. Although specific examples are illustrated in the drawings and described herein, it should be understood that there is no intent to limit various exemplary embodiments of the present disclosure to the particular exemplary embodiments disclosed, but the present disclosure should be construed to cover all modifications, equivalents, and alternatives falling within the spirit and scope of the various exemplary embodiments. In description of the drawings, similar elements are indicated by similar reference numerals.

Hereinafter, the terms "include" or "may include", which may be used in various exemplary embodiments, refer to the presence of disclosed functions, operations or elements, and do not restrict the addition of one or more functions, operations or elements. In the present disclosure, the terms such as "include" or "have" may be construed to denote a certain characteristic, number, step, operation, constituent element, component or a combination thereof, but may not be construed to exclude the existence of or a possibility of additional one or more other characteristics, numbers, steps, operations, constituent elements, components or combinations thereof.

The term "or" in various exemplary embodiments means the inclusion of at least one or all of the disclosed elements. For example, the expression "A or B" may include A, may include B, or may include both A and B.

The expressions "1", "2", "first", or "second" used in various exemplary embodiments may modify various components but do not limit the corresponding components. For example, the above expressions do not limit the sequence and/or importance of the corresponding elements. The expressions may be used to distinguish a component element from another component element. For example, a first user device and a second user device indicate different user devices although both of them are user devices. However, without departing from the scope of the present disclosure, the first user device may be called the second user device. Similarly, the second user device may be called the first user device.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The terms used in various exemplary embodiments are merely used to exemplify a certain exemplary embodiment and should not be construed as limiting. As used herein, the singular forms are intended to include the plural forms as well, unless the context clearly indicates otherwise.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Hereinafter, an encryption apparatus according to various exemplary embodiments will be described with reference to the accompanying drawings.

FIG. 1 is a block diagram illustrating a configuration of an encryption apparatus according to various exemplary embodiments.

Referring to FIG. 1, the encryption apparatus 100 may include a key generator 110, an encryptor 120, and a decryptor 130, and may further include a controller 140 and a database 200.

The key generator 110 may generate a parameter or a secret key to be used by the encryptor 120 or the decryptor 130.

The encryptor 120 may encrypt data, for example, original data (i.e., plaintext), which has been input to the encryption apparatus 100, and thereby may generate ciphertext. The encryptor 120 may convert the plaintext by using the secret key or the parameter generated by the key generator 110, and thereby may generate ciphertext. An order according to sizes, or values, of the pieces of ciphertext generated by the encryptor 120 may be identical to an order according to sizes of the pieces of plaintext. For example, when pieces of plaintext are A, B, and C, and the pieces of plaintext have sizes expressed by A<B<C, A', B' and C', which are pieces of ciphertext generated by the encryptor 120, may have sizes expressed by A'<B'<C'.

The decryptor 130 may decrypt the ciphertext by using the secret key or the parameter generated by the key generator 110, and may reconstruct the plaintext.

The controller 140 may control an overall operation of the encryption apparatus 100. The controller 140 may control the key generator 110 to generate the parameter or the secret key. The controller 140 may control the encryptor 120 to encrypt plaintext which is input to the encryption apparatus 100 or is stored in the database 200. The controller 140 may control the decryptor 130 to decrypt ciphertext, which is input to the encryption apparatus 100 or is stored in the database 200, and to convert the ciphertext into plaintext.

The database 200 may store the ciphertext generated by the encryptor 120, and may store plaintext, which is input to the encryption apparatus 100, or plaintext decrypted by the decryptor 130. The database 200 may extract pieces of ciphertext corresponding to a range query, from the encryption apparatus 100. To this end, pieces of ciphertext may be arranged in order of sizes, and the pieces of ciphertext arranged in order of the sizes may be stored in the database 200. For example, when pieces of ciphertext are natural numbers from 1 to 100, the natural numbers from 1 to 100 may be stored in the database 200 in a state of being arranged in order of values of the natural numbers.

According to another exemplary embodiment, the database 200 may be implemented as a separate element from the encryption apparatus 100. When the database 200 is implemented as a separate element from the encryption apparatus 100, the database 200 may not store the secret key and the parameter generated by the key generator 110. Accordingly, the database 200 may not decrypt pieces of the ciphertext.

Figure 2:
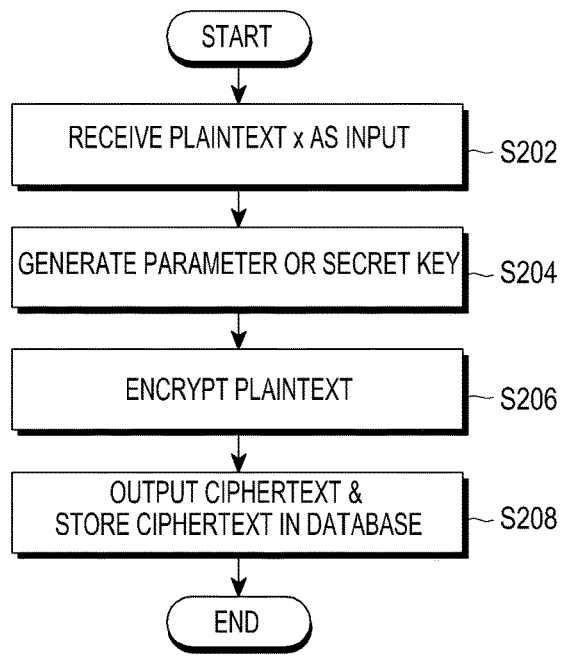
FIG. 2 is a flowchart illustrating a method for performing encryption by an encryption apparatus according to various exemplary embodiments.

FIG. 2 is a flowchart illustrating a method for performing encryption by an encryption apparatus according to various exemplary embodiments. In FIG. 2, a case is considered in which original data (i.e., pieces of plaintext), which is input to the encryption apparatus 100, are elements of non-negative whole numbers less than M, $x \in \{0, 1, \ldots, M-1\}$, and pieces of ciphertext, obtained by encrypting the pieces of plaintext, are elements of non-negative whole numbers less than N, $C \in \{0, 1, \ldots, N-1\}$. In this case, M<N.

Referring to FIG. 2, in operation S202, plaintext x may be input to the encryption apparatus 100. When plaintext x has been input, in operation S204, the key generator 110 may generate a parameter or a secret key for encrypting plaintext x. According to an exemplary embodiment, in operation S204, the key generator 110 may generate a parameter or a secret key by using a bit size d of plaintext x. For example, when original data is $x \in \{0, 1, \ldots, M-1\}$, the key generator 110 may output 'param=N' which is a parameter, and 'key=$\{\alpha, \beta, \gamma, K\}$' which is a secret key. N is a number larger by 1 than a largest possible number from among pieces of ciphertext, and may represent an output range of the pieces of ciphertext.

For example, a case is considered in which plaintext x includes 1, 2, 3, and 4, and in which an order according to values is expressed by '4>3>2>1'. The encryption apparatus 100 may generate 12 which is ciphertext matched to 1, 34 which is ciphertext matched to 2, 56 which is ciphertext matched to 3, and 78 which is ciphertext matched to 4. Accordingly, an order according to values of the pieces of ciphertext may be expressed by '78>56>34>12' as in the case of the plaintext. The database 200 may store 78, 56, 34 and 12, which are the pieces of ciphertext, in descending order. Alternatively, the database 200 may store 12, 34, 56, and 78, which are the pieces of ciphertext, in ascending order.

In operation S204, the key generator 110 may determine $\alpha, \beta, \gamma$ and K, which are the secret keys, by using the bit size d of plaintext x. According to an exemplary embodiment, in order to maintain an order according to values of the pieces of plaintext, among the secret keys generated by the key generator 110, $\gamma$ may be any random number ($0<\gamma<\alpha$) among numbers between 0 and $\alpha$, and $\beta$ may be any random number ($\frac{1}{2}<\beta<1$) between $\frac{1}{2}$ and 1. When $\beta$ and $\gamma$ are determined among the secret keys, the key generator 110 may calculate a parameter N and a secret key vector a as follows:

$$N = \left\lceil \frac{\tau}{\beta \cdot \gamma^d} \right\rceil, N \text{ being the ceiling of } \frac{\tau}{\beta \cdot \gamma^d}, \text{ and}$$

$$\alpha = 1 - \beta.$$

$\tau$ is a value which minimizes a distance between two output values (i.e., pieces of ciphertext) of the encryption apparatus 100. $\tau$ may be set to 2 as a default value. Also, an encryption key K may be determined as a pseudo-random number according to a pseudo-random function.

By setting the secret keys as described above, the encryption apparatus 100 may generate ciphertext including information on the order of the values of the pieces of plaintext x.

When the parameter (i.e., param=N) and the secret key (i.e., key=$\{\alpha, \beta, \gamma, K\}$) have been determined in operation S204 as described above, in operation S206, the encryptor 120 may encrypt the plaintext. Specifically, in operation S206, the encryptor 120 may convert the plaintext x (i.e., $x \in \{0, 1, \ldots, M-1\}$) into ciphertext C (i.e., $C \in \{0, 1, \ldots, N-1\}$,) by using the param=N and the key=$\{\alpha, \beta, \gamma, K\}$.

According to an exemplary embodiment, a case is considered in which the plaintext x and a secret key vector $a_i$ are as follows:

$x := (x_{d-1}, x_{d-2}, \ldots, x_0)$, where x is a d-bit binary number, and $x_{d-j}$ is a bit value of x at the (d−j)th position, where ($1 \leq j \leq d$), and $a_i := (a_0, a_1, \ldots, a_d)$, where ($0 \leq i \leq d$).

The secret key vector $a_i$ may be calculated as follows:

$$a_i = \begin{cases} F_0(K, 0), & \text{if } i = 0, \text{ where } (\alpha N \leq F_0(K, 0) \leq \beta N) \\ F_i(K, x_{d-i}), & \text{if } 1 \leq i \leq d, \text{ where } (\alpha N \gamma^i \leq F_i(K, x_{d-i}) \leq \beta N \gamma^i) \end{cases}.$$

Ciphertext C may be calculated by using Equation (1) below based on the equations as described above.

$$C = a_0 + a_1(2x_{d-1}-1) + \ldots a_d(2x_0-1) = a_0 + \Sigma_{i=1}^d (2x_{d-i}-1))a_i \qquad (1)$$

In Equation (1), x is a d-bit binary number, and $x_{d-i}$ ($1 \leq i \leq d$) is a bit value at the position of each bit. $x_{d-1}$ may be the value of a leftmost significant bit. Also, $F_i$ ($0 \leq i \leq d$) is a random function, and may be implemented in the form of a cryptographic hash function (e.g., SHA-128) or a pseudo-random function (e.g., HMAC-SHA-128).

When the ciphertext C has been calculated as described above, in operation S208, the encryption apparatus 100 may output the ciphertext C and may store the ciphertext C in the database 200. According to another exemplary embodiment, when the database 200 is implemented as an apparatus separate from the encryption apparatus 100, the encryption apparatus 100 may transmit the ciphertext C to the database 200.

Figure 3:
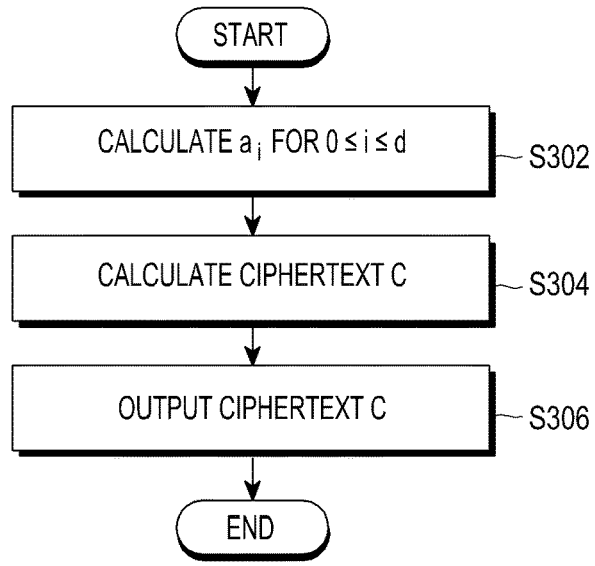
FIG. 3 is a flowchart illustrating a method for performing encryption by an encryption apparatus according to various exemplary embodiments.

FIG. 3 is a flowchart illustrating a method for performing encryption by an encryption apparatus according to various exemplary embodiments.

Referring to FIG. 3, in operation S302, the encryptor 120 of the encryption apparatus 100 may calculate $a_i$ for $0 \leq i \leq d$. In operation S304, the encryptor 120 may calculate ciphertext C according to Equation (1). When the ciphertext C has been calculated, in operation S306, the encryptor 120 may output the ciphertext C.

Figure 4A:
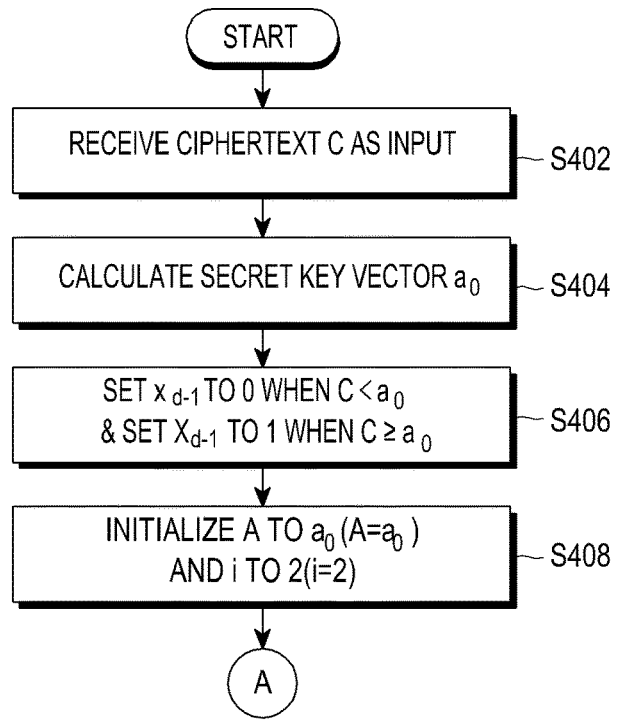
FIGS. 4A and 4B are a flowchart illustrating a method for performing decryption by an encryption apparatus according to various exemplary embodiments.
Figure 4B:
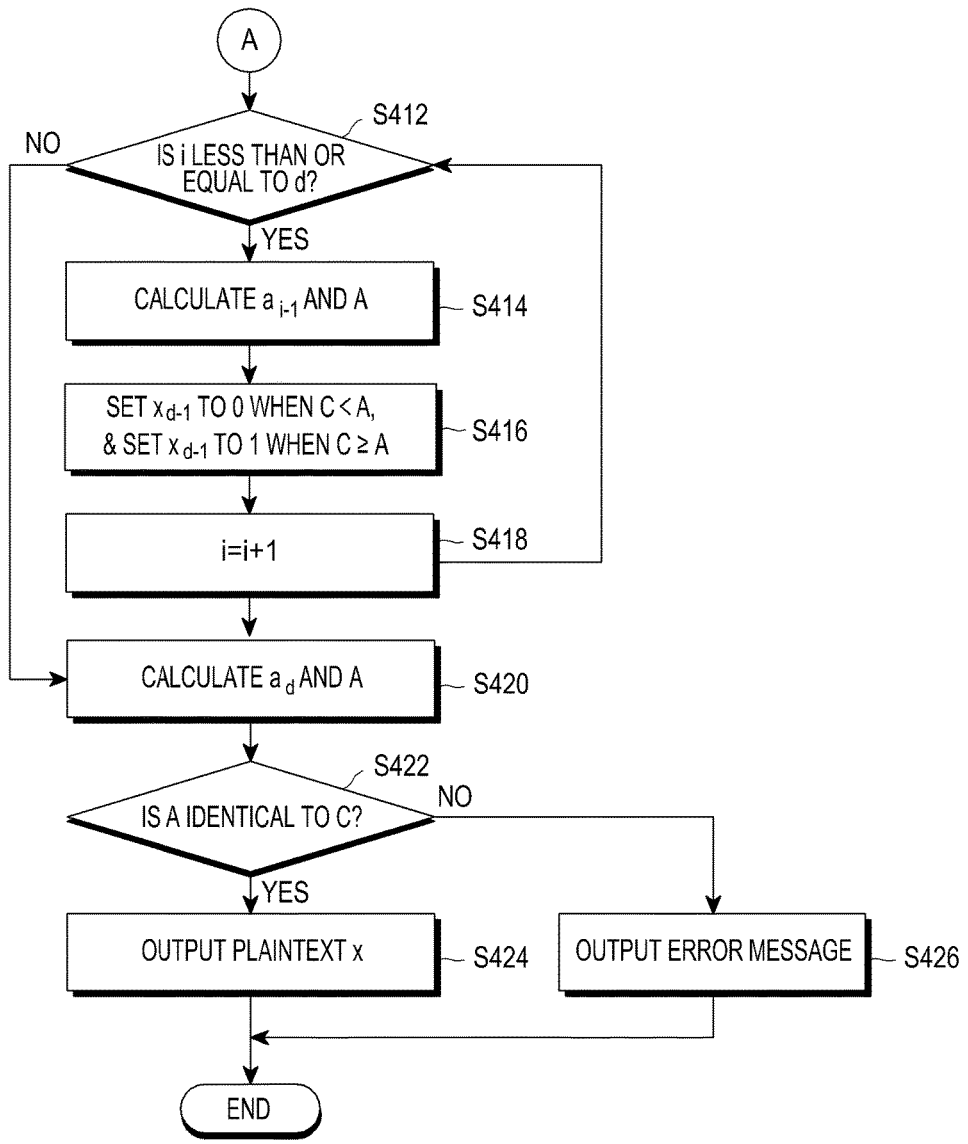

FIGS. 4A and 4B are a flowchart illustrating a method for performing decryption by an encryption apparatus according to various exemplary embodiments.

The encryption apparatus 100 may decrypt ciphertext by using a parameter param or key, which is a secret key, and thereby may reconstruct plaintext. Hereinafter, an example will be described in which plaintext x is reconstructed from ciphertext C. In FIGS. 4A and 4B, a case will be described in which the encryption apparatus 100 reconstructs the plaintext x from the ciphertext C by using 'd+1', which is a level of complexity.

Referring to FIG. 4A, when the ciphertext C is input in operation S402, in operation S404, the decryptor 130 of the encryption apparatus 100 may calculate a secret key vector $a_0$. The secret key vector $a_0$ calculated in operation S404 is as follows:

$$a_0 = F_0(K, 0).$$

In operation S406, the decryptor 130 may compare the secret key vector $a_0$ with the ciphertext C. The decryptor 130 may set the value of plaintext bit $x_{d-1}$ based on a result of the comparison of the secret key vector $a_0$ with the ciphertext C in operation S406. When $C < a_0$, the decryptor 130 may set the plaintext bit $x_{d-1}$ to "0." In contrast, when $C \geq a_0$, the decryptor 130 may set the plaintext bit $x_{d-1}$ to "1."

In operation S408, the decryptor 130 may initialize a sum A of secret key vectors to $a_0$ (i.e., $A = a_0$), and may initialize i to 2 (i.e., i=2).

FIG. 4A has explained the method for calculating only the value of the leftmost significant bit $x_{d-1}$ of the plaintext x. The reconstruction of bits (i.e., $x_{d-2}, \ldots, x_0$) other than the leftmost significant bit $x_{d-1}$ will be described with reference to FIG. 4B.

Referring to FIG. 4B, in operation S412, the controller 140 may determine whether i is less than or equal to d. When it is determined in operation S412 that i is less than or equal to d (Yes in operation S412), in operation S414, the decryptor 130 may calculate $a_{i-1}$ according to Equation (2) below. In operation S414, the decryptor 130 may also add $a_{i-1}$ to the sum A of the secret key vectors and may calculate the sum A, according to Equation (3) below.

$$a_{i-1} = \{F_i(K, x_{d-i+1}) \qquad (2)$$

$$A = A + (2x_{d-i+1}-1)a_{i-1}, \text{ where } 2 \leq i \leq d. \qquad (3)$$

In operation S416, the decryptor 130 may compare the sum A with the ciphertext C, and may reconstruct the value of the plaintext $x_{d-i}$. In operation S416, the decryptor 130 may set the plaintext $x_{d-i}$ to "0" when $C < A$, or may set the plaintext $x_{d-i}$ to "1" when $C \geq A$. The decryptor 130 may increase i by 1 in operation S418, and the controller 140 may again determine, in operation S412, whether i is less than or equal to d.

When i exceeds d (No in operation S412), in operation S420, the decryptor 130 may calculate $a_d$ and A by using Equations (4) and (5) below.

$$(a_d = F_d(K, x_0)) \qquad (4)$$

$$A = A + (2x_0-1)a_d \qquad (5)$$

In operation S422, the controller 140 may determine whether the sum A is identical to the ciphertext C. When it is determined in operation S422 that the sum A is identical to the ciphertext C (Yes in operation S422), in operation S424, the decryptor 130 may output x in Equation (3) as the plaintext x.

In contrast, when it is determined in operation S422 that the sum A is different from the ciphertext C (No in operation S422), in operation S426, the controller 140 may output an error message. By outputting the error message as described above, the encryption apparatus according to embodiments of the present disclosure may notify a user that the plaintext has not been reconstructed.

Figure 5:
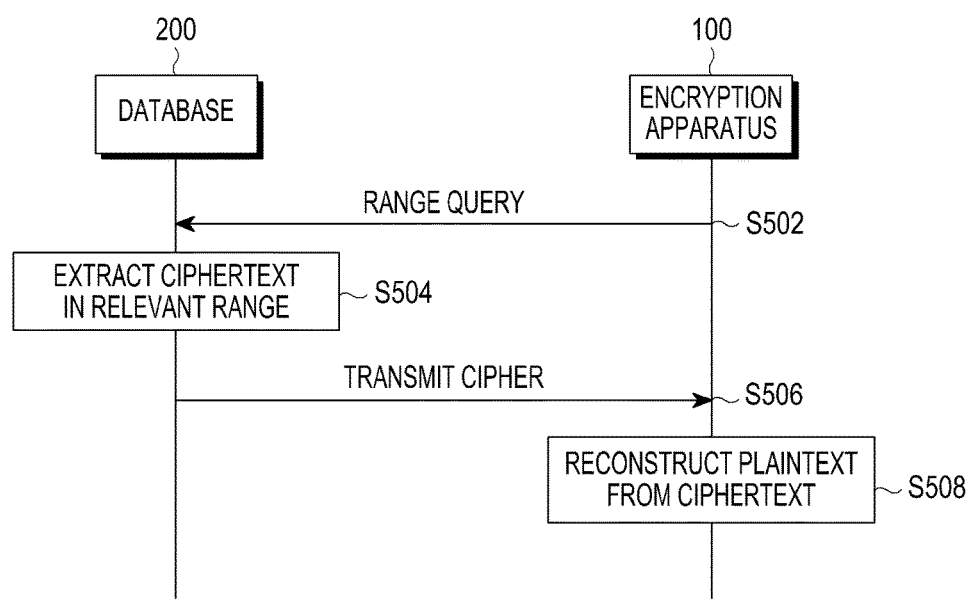
FIG. 5 is a signal flow diagram illustrating a method in which an encryption apparatus operates according to various exemplary embodiments.

FIG. 5 is a signal flow diagram illustrating a method in which an encryption apparatus operates according to various exemplary embodiments. In FIG. 5, a case is considered in which the database 200 is an apparatus separate from the encryption apparatus 100.

Referring to FIG. 5, in operation S502, the database 200 may receive a range query from the encryption apparatus 100. At this time, the encryption apparatus 100 may transmit, to the database 200, a range query corresponding to plaintext. For example, a case is considered in which the database 200 stores pieces of ciphertext matched to respective natural numbers 1 through 100. Specifically, the database 200 may store the pieces of ciphertext matched to respective pieces of plaintext 1 through 100. Also, in operation S502, the encryption apparatus 100 may send, to the database 200, a request for the pieces of ciphertext matched to the respective pieces of plaintext 1 through 100.

The database 200 may extract ciphertext in a relevant range in operation S504, and may transmit the extracted ciphertext to the encryption apparatus 100 in operation S506. In operation S508, the encryption apparatus 100 may decrypt the ciphertext received from the database 200, and may reconstruct plaintext. For example, in operation S504, the database 200 may extract 12, 22, 34, 42, 57, 63, 73, 84, 99 and 104, as pieces of ciphertext matched to respective pieces of plaintext 1 through 10.

The encryption apparatus 100 may deliver, to the database 200, the pieces of ciphertext respectively matched to 1 through 10, and thereby may transmit a range query which requests, from the database 200, the pieces of ciphertext respectively matched to 1 through 10. The database 200 may return, to the encryption apparatus 100, the pieces of ciphertext respectively matched to 2 through 9 as well as the ciphertext matched to 1 and the ciphertext matched to 10. Accordingly, the database 200 may transmit, to the encryption apparatus 100, a response to the range query of the encryption apparatus 100. The database 200 is capable of transmitting, to the encryption apparatus 100, the response to the range query as described above because the pieces of ciphertext matched to the respective pieces of plaintext 1 through 100 are capable of being arranged in order of sizes in the database 200. Specifically, sizes of the pieces of ciphertext stored in the database 200 may be values different from each other in accordance with "the ciphertext matched to 1<the ciphertext matched to 2<the ciphertext matched to 3<the ciphertext matched to 4< . . . <the ciphertext matched to 100." Therefore, the database 200 may extract the pieces of ciphertext respectively matched to 1 through 10 without decrypting the pieces of ciphertext matched to the respective pieces of plaintext 1 through 100.

Also, according to an exemplary embodiment, the pieces of ciphertext matched to the respective pieces of plaintext 1 through 100 are all obtained by being encrypted by the encryption apparatus 100 before being stored in the database 200. Accordingly, the database 200 may not know the parameter and the secret key used to encrypt the pieces of plaintext 1 through 100.

The disclosure disclosed in this description as described above may be employed in the case of encrypting data elements having a sequential order and storing the encrypted data elements in a database. A range query is capable of being performed on the data elements, which are encrypted before being stored according to one or more exemplary embodiments, without a decryption process. One or more exemplary embodiments can be employed without performing a process for decrypting encrypted data in a situation where data is encrypted before being stored and a range query is required. For example, one or more exemplary embodiments may be applied to a relational database, such as MySQL which is a public database. When the one or more exemplary embodiments are applied, the database does not have to perform a decryption process in order to perform a range query on the encrypted data. Because the database does not have to perform the decryption process as described above, the search speed of the database may be identical to that of a database system which is storing pieces of plaintext. Also, because the decryption process may be omitted, a system manager (not shown) (e.g., a Database Management System (DBMS)) that performs a search in the database is not capable of knowing a secret key used for the encryption or decryption. Accordingly, the system manager is not capable of knowing information (e.g., plaintext) stored on the encrypted data, so security may be improved.

For example, a case is considered in which a user stores personal information (e.g., an annual salary, a schedule, age, physical information which is quantized, etc.). The database may store only ciphertext obtained by encrypting the personal information, and only the user may have a secret key or a parameter for decrypting the ciphertext. Accordingly, even if a person hacks into the database or the system manager releases data stored in the database, only the ciphertext is exposed, and thus the personal information of the user is not exposed. As described above, according to the one or more exemplary embodiments, the personal information can be prevented from being exposed, and the database enables a range query simultaneously with providing the confidentiality of data.

The exemplary embodiments disclosed in the specification and the drawings are only particular examples proposed in order to easily describe the technical matters of the present disclosure and help with comprehension of the present disclosure, and do not limit the scope of the present disclosure. Therefore, in addition to the exemplary embodiments disclosed herein, the scope of the various embodiments of the present disclosure should be construed to include all modifications or modified forms drawn based on the technical idea of the various exemplary embodiments of the present disclosure.

What is claimed is:

1. A method for performing encryption by an encryption apparatus, the method comprising:

determining, by a processor of the encryption apparatus, first plaintext x which is received by the encryption apparatus or is stored in a memory of the encryption apparatus;

generating, by the processor a secret key $\{\alpha, \beta, \gamma, K\}$ or a parameter N for encrypting the first plaintext x, wherein the parameter N is a number larger than a largest possible number from among first ciphertext C and represents an output range of the first ciphertext C;

converting, by the processor, the first plaintext x into first ciphertext C by using the secret key $\{\alpha, \beta, \gamma, K\}$ or the parameter N;

controlling, by the processor, the memory to store the first ciphertext C, wherein, from among the secret key $\{\alpha, \beta, \gamma, K\}$, $\gamma$ is a number between 0 and $\alpha$ ($0<\gamma<\alpha$), $\beta$ is a number between ½ and 1 ($\frac{1}{2}<\beta<1$), K is a pseudo-random number according to a pseudo-random function, and $\alpha$ is equal to 1 minus $\beta$ ($\alpha=1-\beta$), determining second ciphertext corresponding to the output range from among ciphertext stored in the memory, wherein the stored ciphertext is arranged in order of values corresponding to the stored ciphertext in the memory; and reconstructing, by the processor, the first plaintext by decrypting the second ciphertext.

2. The method of claim 1, further comprising:

delivering a range query to the memory; and receiving second ciphertext corresponding to the range query from the memory.

3. The method of claim 1, wherein generating the secret key $\{\alpha, \beta, \gamma, K\}$ or the parameter N for encrypting the first plaintext x comprises determining the parameter N and the secret key $\{\alpha, \beta, \gamma, K\}$ by using a bit size d of the first plaintext x.

4. The method of claim 2, further comprising reconstructing second plaintext from the second ciphertext by using the parameter N or the secret key $\{\alpha, \beta, \gamma, K\}$.

5. The method of claim 1, wherein converting the first plaintext x into the first ciphertext C comprises:

determining, by the processor, a set of secret key vectors a based on the parameter N, the secret key $\{\alpha, \beta, \gamma, K\}$, and the first plaintext x; and converting, by the processor, the first plaintext x into the first ciphertext C using the set of secret key vectors α, wherein:
  the first plaintext x is a d-bit binary number, and $x_{d-j}$ is a bit value of the first plaintext x at the (d−j)th position, where (1≤j≤d), according to:
    $x:=(x_{d-1}, x_{d-2}, \ldots, x_0)$,
  the set of the secret key vectors a comprises one or more secret key vectors $a_i$, where (0≤i≤d), according to:
    $a_i:=(a_0, a_1, \ldots, a_d)$, and
  the first ciphertext C is determined according to the equation:

$$C=a_0+a_1(2x_{d-1}-1)+\ldots a_d(2x_0-1)=a_0+\Sigma_{i=1}^{d}(2x_{d-i}-1)a_i, \text{ where } (0\leq i\leq d).$$

6. The method of claim 5, wherein generating the secret key {α, β, γ, K} or the parameter N comprises generating, by the processor, both the secret key {α, β, γ, K} and the parameter N.

7. The method of claim 5, wherein the secret key vector $a_i$, with (0≤i≤d), is defined by:

$$a_i = \begin{cases} F_0(K, 0), & \text{if } i=0, \text{ where } (\alpha N \leq F_0(K,0) \leq \beta N) \\ F_i(K, x_{d-i}), & \text{if } 1 \leq i \leq d, \text{ where } (\alpha N\gamma^i \leq F_i(K, x_{d-i}) \leq \beta N\gamma^i) \end{cases},$$

wherein $F_i$, with (0≤i≤d), is a function.

8. The method of claim 7, wherein $F_i$, with (0≤i≤d), is a cryptographic hash function or a pseudo-random function.

9. An encryption apparatus comprising:
  a memory; and
  a processor configured to:
  determine first plaintext x which is received by the encryption apparatus or is stored in the memory of the encryption apparatus;
  generate a secret key {α, β, γ, K} or a parameter N for encrypting the first plaintext x, wherein the parameter N is a number larger than a largest possible number from among first ciphertext C and represents an output range of the first ciphertext C,
  convert the first plaintext x into first ciphertext C by using the secret key {α, β, γ, K} or the parameter N,
  controlling the memory to store the first ciphertext C,
  wherein, from among the secret key {α, β, γ, K}, γ is a number between 0 and α (0<γ<α), β is a number between ½ and 1 (½<β<1), K is a pseudo-random number according to a pseudo-random function, and α is equal to 1 minus β (α=1−β),
  determine second ciphertext corresponding to the output range from among ciphertext stored in the memory, wherein the stored ciphertext is arranged in order of values corresponding to the stored ciphertext in the memory; and
  reconstruct the first plaintext by decrypting the second ciphertext.

10. The encryption apparatus of claim 9, wherein the processor is further configured to:
  deliver a range query to the memory, and
  receive second ciphertext corresponding to the range query from the memory.

11. The encryption apparatus of claim 9, wherein the processor is configured to determine the parameter N and the secret key {α, β, γ, K} by using a bit size d of the first plaintext x.

12. The encryption apparatus of claim 10, wherein the processor is further configured to reconstruct second plaintext from the second ciphertext by using the parameter N or the secret key {α, β, γ, K}.

13. The encryption apparatus of claim 9,
  wherein the processor is further configured to:
  determine a set of secret key vectors a based on the parameter N, the secret key {α, β, γ, K}, and the first plaintext x, and
  convert the first plaintext x into the first ciphertext C by using the set of the secret key vectors a, and
  wherein:
    the first plaintext x is a d-bit binary number, and $x_{d-j}$ is a bit value of plaintext x at the (d−j)th position, where (1≤j≤d), according to:
      $x:=(x_{d-1}, x_{d-2}, \ldots, x_0)$,
    the set of the secret key vectors a comprises one or more secret key vectors $a_i$, where (0≤i≤d), according to:
      $a_i:=(a_0, a_1, \ldots, a_d)$, and
    the first ciphertext C is determined according to the equation:

$$C=a_0+a_1(2x_{d-1}-1)+\ldots a_d(2x_0-1)=a_0+\Sigma_{i=1}^{d}(2x_{d-i}-1)a_i, \text{ where } (0\leq i\leq d).$$

14. The encryption apparatus of claim 13, wherein the processor is configured to generate both the secret key {α, β, γ, K} and the parameter N.

15. The encryption apparatus of claim 13, wherein the secret key vector $a_i$, with (0≤i≤d), is defined by:

$$a_i = \begin{cases} F_0(K, 0), & \text{if } i=0, \text{ where } (\alpha N \leq F_0(K,0) \leq \beta N) \\ F_i(K, x_{d-i}), & \text{if } 1 \leq i \leq d, \text{ where } (\alpha N\gamma^i \leq F_i(K, x_{d-i}) \leq \beta N\gamma^i) \end{cases},$$

wherein $F_i$, with (0≤i≤d), is a function.

16. The encryption apparatus of claim 15, wherein $F_i$, with (0≤i≤d), is a cryptographic hash function or a pseudo-random function.

* * * * *